United States Patent

[11] 3,583,089

| [72] | Inventor | Carl B. Scarbro<br>3169 Stirling, Pontiac, Mich. 48055 |
|---|---|---|
| [21] | Appl. No. | 825,655 |
| [22] | Filed | May 19, 1969 |
| [45] | Patented | June 8, 1971 |

[54] AQUATIC DEPTH CONTROL DEVICE
8 Claims, 4 Drawing Figs.

[52] U.S. Cl. .................................................. 43/43.13, 43/42.04
[51] Int. Cl. .......................................................... A01k 85/02
[50] Field of Search .......................................... 43/42.04, 42.06, 42.23, 42.5, 43.13, 42.49

[56] References Cited
UNITED STATES PATENTS
2,511,002  6/1950  Perry ............................ 43/42.5

3,229,408  1/1966  Kohfield ....................... 43/43.13X

*Primary Examiner*—Warner H. Camp
*Attorney*—Barnard, Mc Glynn & Reising

ABSTRACT: An aquatic depth control device for connection to trolling fishlines to submerge such lines when trolled but responsive to increased tension to change in orientation and attitude to terminate the submerging force. The device includes a channel-shaped body of the light metal, a pin member which is releasably engaged laterally between the side portions of the channel-shaped body to receive a towline and a connector extending between the pin member and a forward point on the body such that when the pin member is released due to increased towline tension, the tow point changes location on the body to permit the change in orientation and attitude.

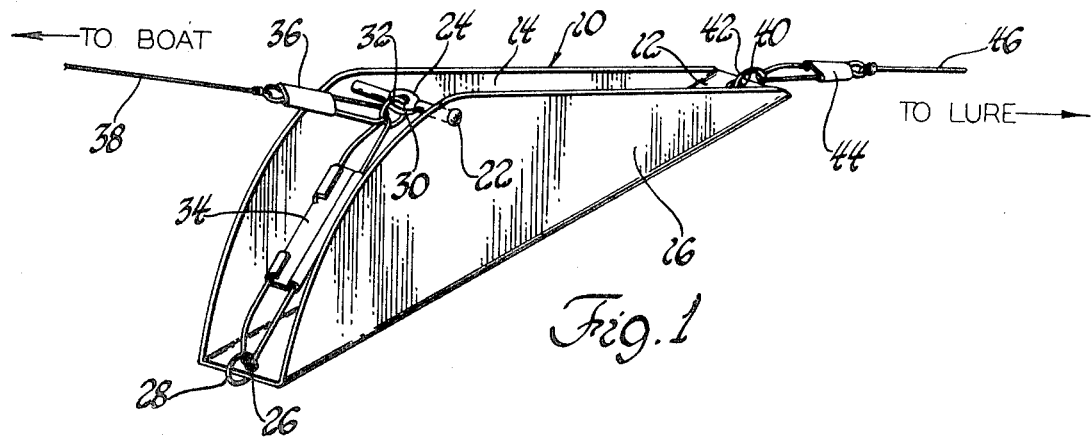
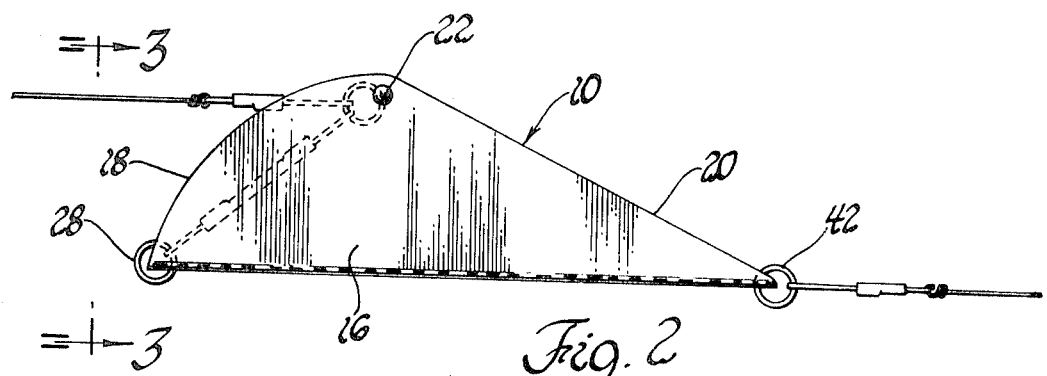
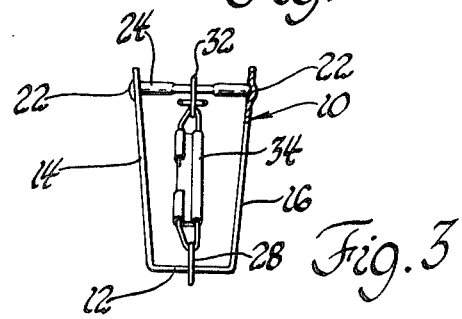
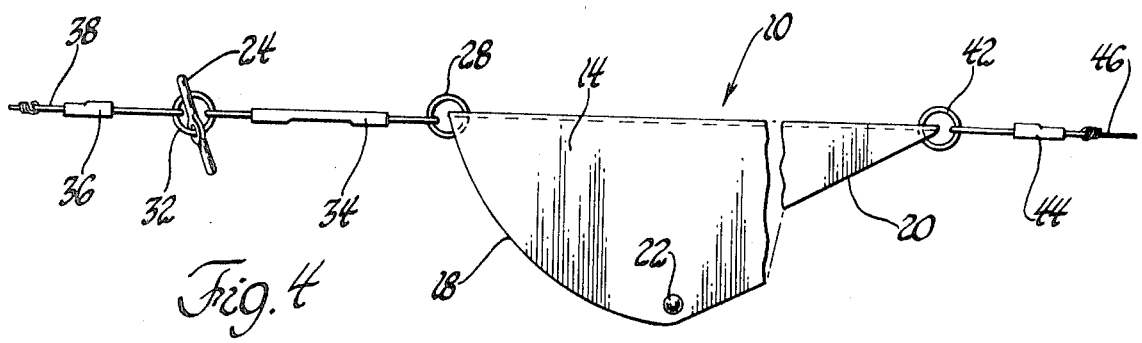
INVENTOR.
Carl B. Scarbro
BY
Barnard, McGlynn & Reising
ATTORNEYS

3,583,089

AQUATIC DEPTH CONTROL DEVICE

This invention relates to fishing devices and more particularly to an aquatic depth control device for submerging a trolling fishline but responding to line tension to change in orientation and attitude to permit the line to be easily drawn to the surface.

It is commonly known that many fish, such as salmon, are most frequently caught at substantial depths in a body of water. To submerge a trolling line to the proper depth, heavy lead sinkers can be attached to the line. However, such sinkers create substantial resistance when the line is reeled in, thus, requiring unnecessary effort and the use of heavier, bulkier line than is often advantageous to use. In addition, such sinkers often cause fouling of the line and are frequently lost along with other expensive tackle which might be attached to the end of the towline.

Accordingly, a number of plow or kite-type devices have been developed to react with the water when towed in such a fashion as to drive the line and bait or lure downwardly toward the desired depth. Such devices usually employ line tension-responsive means to change the attitude of the device in response to the strike of a fish so that the device offers less resistance to being reeled in. In one form, such a device includes a heavy, flat body, a complex arrangement of lines and flexible release devices to change the body from a submerging attitude to a level attitude when a fish strikes the towed line. In another form, a complex bridle arrangement releases one or more of several towlines to permit reorientation of a kitelike body. As a general rule, devices of the type described above are all quite complex and difficult to use in that they require intricate preparation and deployment techniques.

The present invention is an aquatic depth control device for trolling fishlines and the like which is light, inexpensive, and extremely easy to operate, yet, provides a stable submerging action until line tension increases beyond a predetermined amount after which the device changes attitude and orientation and permits the line to be easily retrieved. In general, this is accomplished by a device having a light, channel-shaped body adapted to be towed by a fishline or the like. The device includes a connector which is fixed to a forward portion of the body and releasably secured to a second forward portion of the body which normally constitutes the tow point. This tow point causes the body to assume an inclined attitude which permits the water flowing through the body to produce a downward force component to submerge the device. However, when tension in the line releases the connector, the body is towed from the other portion in a substantially level attitude.

In a preferred embodiment, the device is fabricated from a light noncorrosive metal, such as aluminum, with a bottom portion and a pair of fin-shaped side portions to provide the aquatic channel. A pin member is releasably disposed laterally between the side portions and fastened to the connector so as to pull free from the body upon the application of a predetermined tension force to the towed line. Such release of the pin member causes the body to invert and level off thereby to terminate the drag force applied to the towline and permit the device and lure to be easily reeled to the surface of the water.

The various features and advantages of the invention will become apparent upon reading the following specification which describes an illustrative embodiment of the invention.

This description is to be taken with the accompanying drawings of which,

FIG. 1 is a perspective view of a device employing the invention and assembled in the normal trolling configuration, FIG. 2 is a side view of the device, FIG. 3 is a front view of the device, and, FIG. 4 is a side view of the device in the inverted orientation and level attitude which results from the application of increased tension to the tow line.

Referring to the drawings, the illustrative embodiment of the inventive device comprises a channel-shaped body 10 fabricated from light, noncorrosive material, such as aluminum, and having a substantially rectangular bottom portion 12 and a pair of spaced-apart side portions 14 and 16. The bottom and side portions are preferably fabricated in an integral assembly from a single piece of stock which is bent to form the bottom and side portions. As best shown in FIG. 2, the side portions 14 and 16 are substantially fin-shaped having an arcuate leading edge 18 and a straight trailing edge 20 which tapers smoothly toward the bottom portion 12 with which it merges at the rear of the body 10. The side portions 14 and 16 together with the bottom portion 12 define a channel through which water passes when the body 10 is towed as in the usual trolling operation. Depending upon the attitude and orientation of the body 10, the channel shape reacts with the water to cause the body to submerge as will be further described in the following.

Each of the fin-shaped side portions 14 and 16 is provided with an indentation 22 which produces a shallow pocket on the interior of the channel. The indentations 22 are disposed somewhat forwardly of the longitudinal midpoint of body 10 and are spaced upwardly from the bottom portion 12 as best shown in FIG. 2. The indentations 22 receive a short cylindrical pin member 24 which, when releasably disposed within the indentations 22, extends laterally between the side portions 14 and 16 as best shown in FIG. 3.

The indentations 22 define one of two spaced tow points for the body 10 as will be further described hereinafter. The other of the two spaced tow points is defined by a hole 26 which is formed in the bottom portion 12 adjacent the forward edge of the body 10 as shown in FIG. 1. A split connector ring 28 is disposed in the hole 26. A hole 30 is also formed in the lateral pin member 24 to receive a second split connector ring 32. Extending between the split rings 28 and 32 is a connector 34 which may be of the squeeze pin type. Also fastened to split ring 32 is another single-ended squeeze pin connector 36 which is adapted for connection to a towline 38. Towline 38 extends to the surface and to a suitable craft, not shown, for towing the body 10 through the water.

The depth control device is also adapted to tow a lure or bait a short distance behind. For this purpose a hole 40 is formed in the bottom portion 12 adjacent the rear edge of body 10 to receive a split connector ring 42. The connector ring 42 permits the connection of a squeeze-pin-type connector 44 which is tied to one end of a leader 46. A lure may be attached to leader 46 as indicated in FIG. 1.

In operation, the double headed connector 34 is attached to the rings 28 and 32 and the towline connector 36 is also attached to the split ring 32. The leader connector 44 is attached to the split ring 42. The side portions 14 and 16 are spread slightly with the fingers and the pin member 24 is inserted crosswise in the channel-shaped body 10 between the indentations 22. The entire assembly including body 10 is deployed over the side of a boat and the line 38 is payed out to the proper length. At the proper trolling speed, the channel-shaped body 10 is trolled in the forwardly and downwardly inclined attitude and the substantially upright orientation shown in FIG. 1. This results from the fact that the tow point is effectively between the indentations 22. Water passing through the channel-shaped body 10 reacts against the bottom portion 12 to submerge the body 10. The side portions 14 and 16 act as stabilizing fins to maintain the body 10 in the proper attitude and orientation.

Should a fish strike the lure or bait attached to the towed leader 46, the increased tension resulting in the line 38 causes pin member 24 to be released from the indentations 22. The combination of connector 34 and the pivotal action of the split rings 28 and 32 immediately shifts the tow point from between indentations 22 to the position of hole 26 in the forward end of the bottom portion 12 as shown in FIG. 4. The attitude of body 10 immediately levels off to decrease resistance arising out of reaction with the water. In addition, gravity causes the body 10 to assume the inverted orientation shown in FIG. 4. Since the line 38 extends upwardly on an angle, water passing through the channel-shaped body 10 now reacts against the bottom 12 to produce a slight rising action, thus, permitting the device to be reeled in with little effort.

It will be noted that in the forwardly inclined attitude of FIG. 1, the device also permits the release of pin member 24 should the forward edge of the body 10 encounter a submerged obstacle, such as a log, resting on the bottom of the body of water. Should this happen, the pin member 24 releases from the indentations 22 permitting the body 10 to invert, as shown in FIG. 4. The arcuate leading edge 18 presents a smooth surface which tends to permit the body 10 to pass freely over such obstacles and rise to the surface where it may be reeled in and quickly reset.

In addition, it will be noted that the tension in line 38 which causes the release of pin member 24 from the indentations 22 may be quickly and simply set to the desired level by bending the side portions 14 and 16 relative to bottom portion 12 to the desired degree. As shown in FIG. 3, a slightly increased separation of the side portions 14 and 16 permits a low tension release whereas bending the side portions together increases the tension required to release the pin member 24.

While aluminum is a preferred material from which to fabricate body 10 other light, noncorrosive materials, such as plastic, may also be used. Moreover, the various elements of hardware associated with the illustrative embodiment may assume various forms and it is to be understood that the foregoing description is illustrative in nature. For a definition of the invention reference should be taken to the appended claims.

The embodiments of the invention in which I claim an exclusive property or privilege are defined as follows:

1. An aquatic depth control device comprising a light body having a substantially straight bottom portion and sidewalls and being adapted to react against water passing therethrough when in one orientation, connector means extending between first and second spaced points forwardly on the body and adapted to receive a towline adjacent one end thereof, means disposed rearwardly on the body for connection to a towed line, means releasably securing the connector means adjacent said one end between the sidewalls at one of the spaced points to tow the body from said one point in said orientation and responsive to a predetermined tension in the towline to release the connector means from between the sidewalls to thereafter tow the body from the other of the spaced points thereby to vary the orientation of the body relative to the towline.

2. A device as defined in claim 1 wherein each of the sidewalls comprises an arcuate leading edge and a trailing edge which tapers rearwardly toward the bottom portion.

3. A device as defined in claim 2 wherein the means releasably securing the connector means comprises a pin member pivotally connected to the connector means and adapted to be frictionally engaged laterally between the sidewalls at said one of the spaced points.

4. A device as defined in claim 3 wherein each of the sidewalls has formed therein an indentation for receiving and releasably securing the pin member.

5. A device as defined in claim 4 wherein the body is formed of a single piece of light noncorrosive metal such as aluminum.

6. A device as set forth in claim 4 wherein the connector means is pivotally connected on said one end to the pin member and on the other end to the bottom portion and said one point is mediate the sidewalls and spaced from the bottom portion whereby the body assumes a submerging orientation with the sidewalls generally upstanding when towed from the one point and a substantially level orientation with the sidewalls inverted when towed from the second point.

7. A device as defined in claim 6 wherein the bottom and sidewalls are formed of a light, deformable material to permit variation in the spacing between the sidewalls thereby to adjust the predetermined tension in the towline which causes release of the pin member.

8. A device as defined in claim 1 wherein the body has holes formed therein adjacent the front and rear edges thereof and rings disposed through the holes.